United States Patent Office 3,547,896
Patented Dec. 15, 1970

3,547,896
MERCAPTO TERMINATED URETHANE
LINKED POLYMERS
Marvin B. Smith, Compton, Calif., assignor to Teledyne,
Inc., Los Angeles, Calif., a corporation of Delaware
No Drawing. Continuation-in-part of application Ser. No.
569,467, Aug. 1, 1966, which is a continuation-in-part
of application Ser. No. 459,994, June 1, 1965. This application Jan. 17, 1969, Ser. No. 792,129
Int. Cl. C08g 22/08, 22/04
U.S. Cl. 260—77.5                     12 Claims

ABSTRACT OF THE DISCLOSURE

Mercapto terminated urethane linked polyethers are prepared by reacting a polyether glycol with an epihalohydrin in the presence of a Lewis acid to yield a halogenated polyether glycol which is thereafter reacted with a polyisocyanate. The resulting urethane linked halogen terminated polyether is then reacted with an alkali metal sulfhydrate to yield the desired mercapto terminated urethane linked polyether.

CROSS REFERENCE TO RELATED APPLICATIONS

This application is a continuation-in-part of patent application Ser. No. 569,467, filed Aug. 1, 1966 now abandoned, which in turn is a continuation-in-part of patent application Ser. No. 459,994, filed June 1, 1965, now abandoned.

BACKGROUND OF THE INVENTION

This invention relates to mercapto terminated urethane linked polyethers, processes for making the same, and elastomers producible therefrom.

Since their discovery, polymers which may be cast and cured in place to form an elastomer have found wide application in the building and aircraft industry as sealants, coatings, caulking, and glazing compounds, and in the electrical industry as potting, insulating, and encapsulating compounds and in the missile industry as solid fuel binders. The polymers described in the Le Fave et al. No. 3,138,573, 3,215,677, 3,258,495 and 3,278,496 patents and in the Ephraim No. 3,361,723 patent are examples for such castable polymers and curing systems therefor. The search for improved polymers, however, having higher resistance to solvents, e.g., resistance to corrosion or deterioration by fuels such as kerosene when the polymer is used as a fuel tank sealant, has continued. The present invention was made as a result of the search for such improved polymers.

SUMMARY OF THE INVENTION

Accordingly, a primary object of the present invention is to provide novel improved castable polymers, processes for the production thereof, curing systems therefor, and elastomers producible therefrom.

Other and further objects will be apparent from the following description:

In accordance with the present invention, mercapto terminated urethane linked polyethers are provided by a process which comprises reacting a polyether glycol with an epihalohydrin in the presence of a Lewis acid to yield a halogenated polyether glycol which is thereafter reacted with a polyisocyanate. The resulting urethane linked halogen terminated polyether is then reacted with an alkali metal sulfhydrate such as sodium sulfhydrate to yield the desired mercapto terminated urethane linked polyether.

One of the aspects of the present invention is the linking of various hydroxy groups along the halogenated polyether glycol chain, by the polyisocyanate. This is believed to result in not only a more rapid curing, but also in improved solvent resistance and general chemical and physical stability.

The castable polymers of the present invention have relatively low sensitivity to air curing (air oxidation) and, thus, need not be used immediately upon being made. This may be advantageous, for example, where the castable polymer is made at one location, and then shipped to another location for subsequent curing to its elastomeric form.

Castable polymers of the present invention may be cured by oxidation into elastomers with conventional oxidative curing agents such as the oxides of lead, zinc, manganese, and chromium.

Further, the polymers of the present invention exhibit good compatibility when mixed with other resins such as epoxys. For example, mixtures of epoxy resin and polymers of the present invention may be cured at ambient conditions to a resilient plastic material having an "elastic memory."

Other aspects and advantages of the present invention will be apparent from the following more detailed description.

DESCRIPTION OF THE PREFERRED EMBODIMENTS

The polyether glycols, sometimes referred to as polyoxyalkylene glycols, suitable for use in the present invention may have from 2 to 6, and preferably from 2 to 3, active hydroxy groups per molecule. Further, the polyether glycols used in the present invention should have an average molecular weight of at least 400, and preferably from about 400 to about 4,000.

Examples of suitable polyether glycol having 2 hydroxy groups include the polypropylene glycols formed by adding propylene oxide to a propylene glycol nucleus. These polypropylene glycols are well known to those skilled in the art, and are nonvolatile liquids with a slight ether like odor. They are normally water white, and with increasing molecular weight, their water solubility decreases. These polypropylene glycols can be exemplified by the following structural formula:

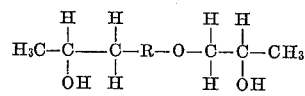

wherein R is a recurring oxyalkalene unit exemplified by the following structural formula:

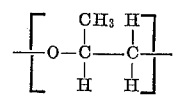

Other suitable polyether glycols having 3 hydroxy groups include those of the series of polyoxypropylene derivatives of trimethylol propane exemplified by the formula:

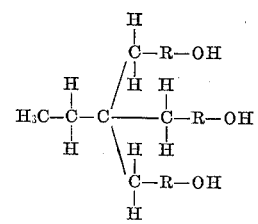

wherein R has the meaning given above.

The polyether glycols described above can be used separately or in mixture with each other, thus making it possible to attain a wide range of physical properties in the final product. For example, by varying the molecular weight and degree of hydroxy functionality such properties as elongation, tensile strength and hardness may be controlled.

The preparation of these polyether glycols is well known; see, for example, Polymers and Resins, Golding, pp. 354–355 (D. Van Nostrand & Co., New York, 1959).

The epihalohydrins which are reacted with the polyether glycols heretofore described can be represented by the following formula:

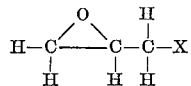

wherein X is a halogen radical such as fluorine, chlorine, bromine or iodine, and their preparation is well known to those skilled in the art.

Epichlorohydrin and epibromohydrin are preferred, with epichlorohydrin most preferred in view of availability and cost.

Any catalyst which is acid in the Lewis sense may be used to catalyze the reaction between the heretofore described polyether glycols and epihalohydrins. Suitable Lewis acid catalysts include the halides of tin, aluminum, iron, boron, phosphorous, zinc, titanium and antimony. For example, the chlorides of tin, aluminum, iron phosphorous, zinc, antimony and titanium are suitable. Also, the fluorides of boron, aluminum, iron, zinc and titanium may be used. Bromides and iodides of the above may also be used.

Stannic chloride appears to be the most effective of the above.

Other inorganic acids such as hydrochloric, sulfuric, phosphoric, perchloric, hydrofluoric and fluoroboric acids may be used. Organic acids which may be used include P-toluene sulfonic acid, acetylsulfuric acid, glacial acetic acid and oxalic acid.

The boron trifluoride complexes with ethers and organic acids are also suitable. For example, boron trifluoride etherate can be used.

The polyisocyanates used to link the halogenated polyether glycol are those compounds which have on the average more than one active isocyanate group per molecule, and include both the simpler diisocyanates such as toluene diisocyanate and the so-called polyisocyanate "prepolymers" hereinafter described.

The preparation of these polyisocyanates is known; for example, polyisocyanates can be obtained by the well known reactions of polyamides with phosgene.

Non-limiting examples of polyisocyanates include toluene diisocyanate, hexamethylene diisocyanate, diphenylmethane diisocyanate, triphenylmethane triisocyanate, naphthalene diisocyanate, meta-phenylene diisocyanate, diphenyl diisocyanate, diphenyl ether diisocyanate, dianisidine diisocyanate, ethylene diisocyanate, and diethyl ether diisocyanate.

Polyisocyanates of the above types may be used separately or as mixtures with each other. For example, mixtures of the isomers 2,4-toluene diisocyanate and 2,6-toluene diisocyanate may be used in weight ratios, for example, of about 65/35 to 80/20.

Use can also be made of the relatively non-volatile polyisocyanates, sometimes referred to as polyisocyanate prepolymers, which have been obtained by reaction of polyhydric alcohols, such as the polyether glycols mentioned above, with a stoichiometric excess of polyisocyanates of the above described type.

Non-limiting examples of such polyisocyanate prepolymers are the addition products of the polyether glycols described above and toluene diisocyanate in amounts which give prepolymers having from about 5 to about 10 weight percent free isocyanate content.

The preparation of these polyisocyanates is well known in the art and for sake of brevity are not further described herein.

An alkali metal sulfhydrate, i.e., an alkali metal hydrosulfide, is reacted with the heretofore described resulting urethane linked halogen terminated polyether to yield the desired mercapto terminated urethane linked polyether.

For example, sodium sulfhydrate and potassium sulfhydrate may be used for this reaction. As it is readily available, sodium sulfhydrate is preferred. This compound is well known, normally exists as rather colorless needles to lemon colored flakes, and is usually obtained from calcium sulfide by treating it with sodium bisulfate.

The mercapto-terminated urethane linked polyethers of the present invention may be formed by reacting one or more of the above described polyether glycols with one or more of the above described epihalohydrins, reacting the resulting halogenated polyether glycol with a polyisocyanate, and then reacting the resulting urethane linked halogenated polyether with an alkali metal sulfhydrate, for example, by reacting a polypropylene glycol (HO—R—OH)

epichlorohydrin, toluene diisocyanate and sodium sulfhydrate as exemplified by the following:

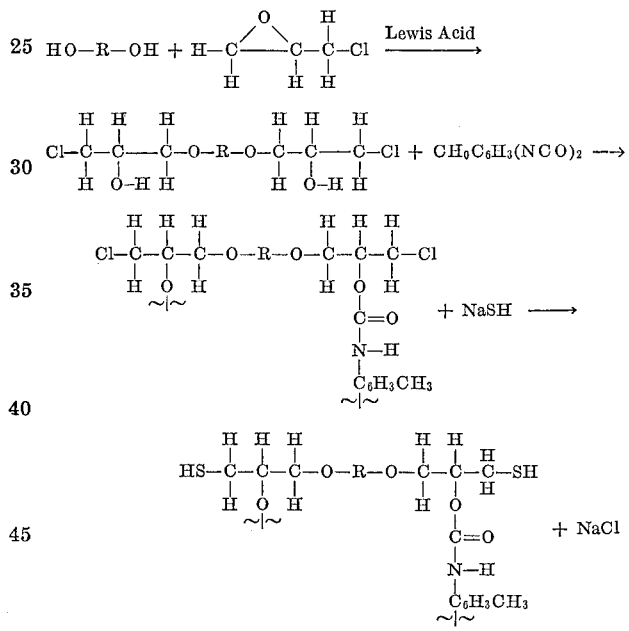

The reaction between the polyether glycol and the epihalohydrin is done by generally known techniques and is normally catalyzed by a Lewis acid, examples of which are described above.

The amount of epihalohydrin preferably ranges from a substantially stoichiometric equivalent based on the amount of type of polyether glycol used, to an excess not more than about 15% by weight. However, quantities somewhat less than stoichiometric, e.g., up to 5% less, may be used if it is desired to modify or alter physical or chemical properties of the resulting polymer.

The reaction of the epihalohydrin with the polyether glycol may be conducted at a temperature above about 70° C., preferably between 70° C. and 130° C., and most preferably between about 110° C. to 120° C., until the reaction is substantially complete, e.g., for about 1 to 5 hours.

The reaction may be conducted in the presence of air, or an inert atmosphere such as nitrogen, argon or the like. Any convenient pressure may be used during the reaction, atmospheric or autogenous pressure being convenient.

The Lewis acid should be present in the above reaction in a catalytic amount as is known to those skilled in the art, e.g., from about .001 to 10%, and preferably between about 1 to 5%, based on the weight of epihalohydrin.

The resulting halogenated polyether glycol is then reacted with a polyisocyanate.

Preferably, the amount of polyisocyanate should be such that there is a substantially stoichiometric amount of an excess not more than about 10% by weight of free isocyanate groups for the hydroxy groups present on the halogenated polyether glycol chain. However, quantities less than stoichiometric, e.g., up to 5% less, may also be used if it is desired to have some of the hydroxy groups unreacted for purposes of altering or modifying the resulting polymer.

The reaction of the polyisocyanate with the halogenated polyether glycol may be conducted at a temperature above about 100° C., preferably between about 100° C. and 130° C., and most preferably between about 110° C. and 120° C., for about 1 to 5 hours.

The reaction may be conducted in the presence of air, or in an inert atmosphere of nitrogen or argon or the like. Any convenient pressure may be used during the reaction, with atmospheric or autogenous pressure convenient.

The resulting urethane linked halogen terminated polyether is then reacted with an alkali metal sulfhydrate such as sodium sulfhydrate to yield the desired mercapto terminated urethane linked polyether.

Alkali metal sulfhydrates such as sodium sulfhydrate are normally solid or powdered and may be dissolved in a suitable inert solvent such as dimethylformamide prior to reaction.

Preferably, the amount of alkali metal sulfhydrate should be a substantially stoichiometric amount, or higher, for complete reaction with the halogen groups on the polymer chain.

However, quantities less than stoichiometric, e.g., up to 5% less, can be used if it is desired to have some of the halogens unreacted.

The reaction of the alkali metal sulfhydrate with the halogen terminated urethane linked polyether may be conducted at a temperature of above about 50° C., preferably above about 100° C., and most preferably from about 100 to 120° C. with constant agitation for 1 to 5 hours depending on the nature of the intermediate.

The reaction is conducted in the presence of air or an inert atmosphere such as nitrogen or argon. Any convenient pressure may be used during the reaction with atmospheric pressure being convenient.

The final mercapto terminated urethane linked polyether may be recovered from the reaction mixture by, for example, vacuum filtration.

All of the above reactions may be carried out on a continuous, semi-continuous or batch basis.

The invention is additionally illustrated by the following examples in which all parts and percentages are by weight unless otherwise indicated.

EXAMPLE I

To a resin kettle equipped with an electric stirrer, thermometer and condenser, 400 grams of a propylene oxide adduct of propylene glycol, a diol polyether glycol, having a molecular weight of approximately 400, were added along with 186 grams (2 moles) epichlorohydrin and 1.4 milliliters stannic chloride. These were allowed to react for 1.5 hours at 120° C. Then 87 grams (.5 mole) of toluene diisocyanate were added and allowed to react for 2 hours at 110 to 120° C. At this point, 160 grams (2 moles) of sodium sulfhydrate dissolved in dimethylformamide were added and allowed to react for 2 hours at 110 to 120° C. The resulting polymer was filtered, using the vacuum principle, yielding a clear-amber, salt-free polymer.

EXAMPLE II

To a resin kettle equipped with an electric stirrer, thermometer and condenser, 1010 grams of a propylene oxide adduct of propylene glycol, a diol polyether glycol, and having a molecular weight of approximately 1000 were added along with 185.0 grams (2 moles) epichlorohydrin and 1.5 milliliters stannic chloride. This mixture was allowed to react at 110 to 120° C. for 1½ hours; then 87 grams (5 moles) toluene diisocyanate were added and allowed to react at 110 to 120° C. for an additional 2 hours. At this point, 160 grams (2 moles) of sodium sulfhydrate dissolved in dimethylformamide were added and allowed to react for an additional 5 hours at 110° C. The prepared polymer was filtered, using the vacuum principle, yielding a salt-free, clear amber polymer with a viscosity of 200 poises.

EXAMPLE III

To a resin kettle equipped with an electric stirrer, thermometer and condenser, 1476 grams of a polyoxypropylene derivative of trimethylolpropane, a triol resin, of approximately 4000 molecular weight, were added along with 140.0 grams epibromohydrin (10% excess) and 1.5 milliliters stannic chloride and allowed to react for 2 hours at 110° C. Then 29 grams of toluene diisocyanate were added and allowed to react for 1 hour at 120° C. At this point 82 grams (1 mole) of sodium sulfhydrate dissolved in dimethylformamide were added and allowed to react for 3 hours at 110° C. The polymer so produced was filtered, using the vacuum principle, yielding a clear amber, salt-free polymer.

The various polymers resulting from the process of the present invention are readily curable in many ways, and show compatibility with other resins as the following examples indicate:

EXAMPLES IV–V

To the resin of Example I, the following blends were made and dispersed over a three-roll paint mill. Upon the addition of the indicated curing agents, the compounds cured to an elastomer state. The properties make them suitable as a two-part castable elastomer, and usable as a sealant or as industrial caulking and glazing compounds.

| Materials | Amounts (parts by weight) | |
| --- | --- | --- |
|  | IV | V |
| Resin from Example I | 65.0 | 50.0 |
| Adhesion promoters | 2.0 | 1.0 |
| Inert fillers (CaCO₃) | 20.0 | 48.8 |
| Thixotropic agent | 1.0 | 0.2 |
| Titanium dioxide pigment | 12.0 |  |
| Total | 100.0 | 100.0 |
| Curing agent, 50% MnO₂; 50% inert plasticizer | 10.0 | 10.0 |
| Total | 110.0 | 110.0 |

In addition to using 50% $MnO_2$ as a curing agent, suitable elastomers were made using 70% $ZnO_2$, and 35% $PbO_2$ as the curing agent.

EXAMPLE VI

The resin resulting from Example I was mixed with calcium carbonate in a weight ratio of 100/100 and passed over a three-roll paint mill. The material was then mixed with 20 parts manganese dioxide catalyst (50% $MnO_2$, 50% inert plasticizer) and allowed to cure. The result was an excellent rubber-like substance exhibiting good elongation and resiliency.

EXAMPLE VII

The resin of Example I was mixed with a commercially available epoxy resin, a complex polymeric reaction product of polyhydric phenols with polyfunctional halohydrin, having an epoxide equivalent of 185, in a ratio of 100 parts resin of Example I to 200 parts epoxy and 20 parts of accelerator (diethylene triamine). The material cured at room temperature to a hard, flexible plastic.

EXAMPLE VIII

The resin of Example II was mixed with calcium carbonate filler using equal parts by weight, and then mixed with 20 parts by weight of a 50% $PbO_2$, 50% inert plasticizer, curing agent. The resulting product was an excellent rubbery elastomer suitable as a sealant.

The following examples set forth specific illustrations of the use of the polyisocyanate prepolymers instead of the simpler diisocyanates such as toluene diisocyanate.

Specific examples of the main reactions employing such prepolymers are as follows:

EXAMPLE IX

To a resin kettle equipped with a stirrer, thermometer and condenser, 400 grams of a propylene oxide adduct of propylene glycol, a diol polyether glycol, having a molecular weight of approximately 400, are added along with 185 grams (2 moles) epichlorohydrin and 1.5 ml. stannic chloride. These reactants were allowed to react for one and one-half hours at 120° C. after which 680 grams (.5 mole) polyisocyanate prepolymer produced by the reaction of toluene diisocyanate with a polyether glycol described above, and having about 5% free isocyanate groups, are added and allowed to react for 2 hours at 110 to 115° C. At this point 500 ml. of isopropyl alcohol plus 2 drops of polymeric silicone antifoaming agent are added and mixed for about 5 minutes. After a complete mixing of the alcohol-antifoam mixture, 160 grams (2 moles) of sodium sulfhydrate are added and allowed to react for 2.5 hours at 85 to 95° C. The resulting polymer is filtered and the alcohol is stripped off using the vacuum principle, yielding a clear amber polymer.

EXAMPLE X

To a resin kettle equipped with an electric stirrer, thermometer and condenser, 400 grams of a propylene oxide adduct of propylene glycol, a diol polyether glycol, having a molecular weight of approximately 400, are added along with 186 grams (2 moles) epichlorohydrin and 1.5 ml. stannic chloride. These reactants are allowed to react for one and one-half hours at 120° C., after which 670 grams (½ mole) of a polyisocyanate prepolymer produced by the reaction of toluene diisocyanate and a polyether glycol described above, and having about 6% free isocyanate groups, a specific gravity of 1.06 at 75° F., a Brookfield viscosity at 86° F. of 6,000 cps. and at 212° F. of 300 cps., are added and allowed to react for two hours at 110 to 115° C. At this point 500 ml. of isopropyl alcohol plus 2 drops of an antifoam agent are added and allowed to mix for five minutes. After complete mixing of the alcohol-antifoam mixture, 160 grams of sodium sulfhydrate are added and allowed to react for two and one-half hours at 85° to 90° C. Last, the polymer is filtered and the alcohol is stripped off, using the heat-vacuum principle, yielding a clear amber polymer.

Examples of the curing of compounds to produce final elastomers from the polymers described above are as follows:

EXAMPLES XI–XII

To the resin produced in Example IX above, the following blends were made and dispersed over a three-roll paint mill. Upon the addition of curing agents, the compounds were cured to an elastomeric state. These compounds were thus very useful as a two-part sealant or industrial caulk and glaze compound.

| Material | Amount (parts by weight) | |
|---|---|---|
|  | XI | XII |
| Resin per Example IX | 100.0 | 100.0 |
| Adhesion promoter (phenolic resin) | 1.0 | 1.0 |
| Inert fillers (calcium carbonate) | 40.0 | 40.0 |
| Catalyst (thiuram disulfide) | 0.5 | 0.75 |
| Thixotropic agent (stearic acid) |  | 1.0 |
| Total | 141.5 | 142.8 |

In the above blend, the curing agent in both examples was 50% $MnO_2$ with the remainder an inert plasticizer (dioctyl phthalate). The amount was ten parts by weight.

In addition to using $MnO_2$ as a curing agent, elastomers have been made using $ZnO_2$, $PbO_2$ and organic peroxides.

Further examples are as follows:

EXAMPLE XIII

The resin resulting from Example IX was mixed with calcium carbonate in a weight ratio of 100/100 and passed over a three-roll paint mill. The material was then mixed with twenty parts manganese dioxide (50/50 $MnO_2$/inert plasticizer) and allowed to cure. The result was an excellent rubber-like material exhibiting good elongation and resiliency.

EXAMPLE XIV

The resin of Example IX was mixed with a commercial epoxy having an epoxide equivalent of 185 in the ratio of 100 parts resin to 200 parts epoxy and 20 parts of accelerator diethylenetriamine. The material cured up at room temperature to a hard flexible plastic.

EXAMPLE XV

The resin of Example X was intimately mixed with calcium carbonate filler, equal parts by weight, and then mixed with 20 parts by weight of curing agent (50% $PbO_2$, 50% inert plasticizer). The result was an excellent rubbery elastomer suitable as a sealant.

EXAMPLE XVI

One hundred grams of the resin produced in Example X was mixed with 100 grams inert filler, 10 grams of a plasticizer and cured with 4.5 grams of a trimethylol propane triacrylate/primary amine mixture in a ratio of 40/1 which resulted in an excellent caulk.

It has been found that the use of the prepolymer, in contrast to the use of the simple toluene diisocyanate, produces a better and more precise control of the final process, as well as control of the characteristics of the final product. Also, somewhat better properties are attained in the form of elongation, tear strength and chemical resistance. The use of the prepolymers gives increased freedom in varying parameters, in that the starting polyether glycol forming the backbone of the prepolymer can vary in molecular weight from 400 up to 4000 or higher.

The conversion or curing of the castable polymers to commercially useful elastomers normally involves, in addition to the curing agent, other modifiers, reinforcing pigments, and other additives desirable to the production of various end products, and well known to those skilled in the art.

The principles, preferred embodiments, and modes of operation of the present invention have been described in the foregoing specification. The invention which is intended to be protected herein, however, may be practiced other than is described without departing from the scope of the appended claims.

I claim:
1. A process for the production of mercapto terminated, urethane linked polyethers, which process comprises:
   (a) reacting a polyether glycol having more than one hydroxy group with an epihalohydrin in the presence of a Lewis acid catalyst to form a first intermediate polymer,
   (b) reacting the first intermediate polymer with a polyisocyanate having free isocyanate groups to react with substantially all of the free hydroxy groups on the first intermediate polymer to form a second intermediate polymer, and
   (c) reacting the second intermediate polymer with an alkali metal sulfhydrate, whereby a mercapto terminated urethane linked polymer is formed.
2. The process of claim 1 wherein the polyether glycol has a molecular weight in the range of from 400 to 4000 and is reacted with a substantially stoichiometric amount of epihalohydrin.

3. The process of claim 2 wherein the second intermediate polymer is reacted with a substantially stoichiometric amount of an alkali metal sulfhydrate selected from the class consisting of the sulfhydrates of sodium and potassium.

4. The process of claim 3 wherein the epihalohydrin is epichlorohydrin, the Lewis acid is stannic chloride, and the polyisocyanate is toluene diisocyanate.

5. A process for the production of mercapto terminated, urethane linked polyethers, which process comprises:
(a) reacting a polyether glycol having a molecular weight in the range of from about 400 to 4000 and selected from the class consisting of

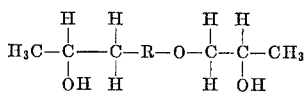

and

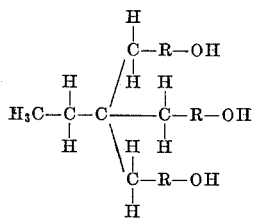

wherein R is the recurring oxyalkylene unit

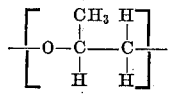

with a substantially stoichiometric amount of an epihalohydrin, in the presence of a Lewis acid catalyst to form a first intermediate polymer,
(b) reacting the first intermediate polymer with a polyisocyanate to form a second intermediate polymer whereby all free hydroxy groups of the first intermediate polymer have reacted with the free isocyanate groups on the polyisocyanate, and
(c) reacting the second intermediate polymer with a stoichiometric amount of an alkali metal sulfhydrate whereby a mercapto terminated urethane linked polyether is formed.

6. The process of claim 5 wherein the first intermediate polymer is reacted at a temperature between about 100 and 130° C. with a polyisocyanate selected from the class consisting of toluene diisocyanate and polyisocyanate prepolymers derived from toluene diisocyanate and having free isocyanate groups.

7. The process of claim 5 wherein the epihalohydrin is selected from the class consisting of epichlorohydrin and epibromohydrin, and the alkali metal sulfhydrate is selected from the class consisting of the sulfhydrates of sodium and potassium.

8. The process of claim 7 wherein the epihalohydrin is epichlorohydrin, the Lewis acid is stannic chloride, and the alkali metal sulfhydrate is sodium sulfhydrate.

9. A mercapto terminated urethane linked polyether produced in accordance with claim 1.

10. A cured elastomeric product resulting from a reaction of the polymer of claim 9 with an oxidizing agent selected from the group consisting of the oxides of lead, zinc, manganese, and chromium.

11. A mercapto terminated urethane linked polyether produced in accordance with claim 5.

12. A cured elastomeric product resulting from a reaction of the mercapto terminated urethane linked polyether produced according to claim 5 with an oxidizing agent selected from the group consisting of the oxides of lead, zinc, manganese, and chromium.

References Cited

UNITED STATES PATENTS 3,215,677  11/1965  Le Fave et al.  260—79

HOSEA E. TAYLOR, Primary Examiner

M. J. WELSH, Assistant Examiner

U.S. Cl. X.R.

260—37